United States Patent Office

2,803,625
Patented Aug. 20, 1957

2,803,625
CHROMIUM COMPLEX DISAZO DYESTUFFS

Rolf Pütter, Dusseldorf, Germany, assignor to Farbenfabriken Bayer Aktiengesellschaft, Leverkusen, Germany, a corporation of Germany No Drawing. Application November 13, 1952,
Serial No. 320,340

Claims priority, application Germany November 15, 1951

8 Claims. (Cl. 260—148)

The present invention relates to new disazo dyestuffs and their chromium complex compounds and to processes of making the same; more particularly it relates to disazo dyestuffs of the general formula:

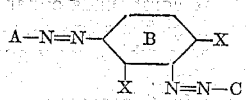

and the chromium complex compounds thereof.

In this formula A—N=N— stands for the radical of a diazo component of the benzene or naphthalene series containing a sulfonic acid group, C stands for a coupling component free from carboxylic and sulfonic groups, namely hydroxynaphthalenes, 1-aryl-5-pyrazolones, acetoacetarylamides, and substitution products thereof, and one of the radicals X attached to the benzene nucleus B represents a hydroxy group while the other X is hydrogen.

The new disazo dyestuffs are obtainable by coupling diazotized aminomonoazo dyestuffs of the general formula:

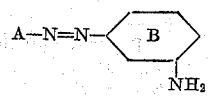

wherein A has the same meaning as stated above and benzene nucleus B bears in one of the o-positions with respect to the NH$_2$-group a hydroxy group, with hydroxynaphthalenes, 1-aryl-5-pyrazolones, acetoacetarylamides or substitution products of these coupling components which are, however, free from sulfonic and carboxylic acid groups. The aminomonoazo dyestuffs used as starting diazo components are in general known compounds obtained e. g. by coupling a diazotized diazo component of the benzene or naphthalene series containing a sulfonic acid group, with a 2-acylamino-1-hydroxybenzene and converting the acylamino group in the monoazo dyestuff thus obtained into an amino group by saponification. Suitable diazo components of the benzene and naphthalene series used here are e. g. 1-aminobenzene-4-sulfonic acid, 1-aminobenzene-3-sulfonic acid, 1-aminobenzene-2-sulfonic acid or their substitution products such as 1-amino-4-methylbenzene-2-sulfonic acid, 1-amino-4-methylbenzene-3-sulfonic acid, 1-amino-4-chlorobenzene-2-sulfonic acid, 1-aminonaphthalene-4-sulfonic acid, 1-aminonaphthalene-5-sulfonic acid, 1-aminonaphthalene-6-sulfonic acid, 1-aminonaphthalene-7-sulfonic acid, mixtures of the 1,6- and the 1,7-acid, 2-aminonaphthalene-6-sulfonic acid, 2-aminonaphthalene-8-sulfonic acid.

The disazo dyestuffs described above can be converted into the corresponding chromium compounds by a treatment with chromium yielding agents; this treatment can be carried out either with the dyestuffs as such or with the dyestuffs on the fibre and in the latter case either by the one-bath chrome process or by the after-chroming process.

The new dyestuffs—converted into the chromium complex compounds either in substance or on the fibre— dye animal fibres or polyamide fibres brown to olive shades of good fastness to light and wet treatment. The chromium containing dyestuffs prepared in substance show the further advantage of dyeing well animal fibres from neutral to weakly acid dyeing baths.

The following examples illustrate the present invention without, however, limiting it thereto:

Example 1

17.3 grams of 1-aminobenzene-4-sulfonic acid are diazotized in the usual manner and added at 0–5° C. to a solution prepared from 15.1 grams of 2-acetylamino-1-hydroxybenzene, 10 cc. of a 30 percent caustic soda solution and 25 grams of sodium carbonate in 100 cc. of water. After stirring the mixture for half an hour, 1/10 of its volume of a 30 percent caustic soda solution is added and the mixture is then heated for one hour to 100° C. After this time the mixture is rendered weakly acid by means of hydrochloric acid, and the precipitation is completed by adding sodium chloride and filtered. The hydroxyaminomonoazo dyestuff thus obtained is dissolved in water under addition of caustic soda solution. 7 grams of sodium nitrite are added to the solution which is then slowly added to diluted hydrochloric acid at 5–10° C. with good stirring. After complete diazotization the solution is coupled with an alkaline (caustic soda) solution of 14.4 grams of 2-hydroxynaphthalene. The disazo dyestuff is separated at a pH-value of 10 by adding sodium chloride and filtered; it corresponds in the free state to the formula:

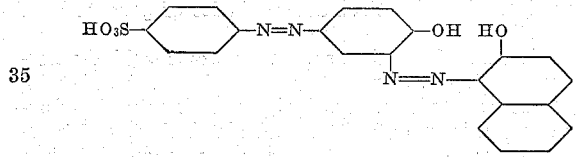

The new dyestuff dyes animal fibres red shades. By an after-treatment of such dyeings with chromium yielding agents the shade changes towards black-brown. The dyeings show good fastness to wet processing and to light. By the monochrome method dyeings with similar fastness properties are obtained.

Example 2

47 grams of the o,o'-dihydroxydisazo dyestuff described in Example 1 are dissolved in water with addition of caustic soda solution; at 20° C. the solution is rendered weakly acid with acetic acid and a solution of 30 grams of chromium fluorid (containing crystal water) is added. The mixture is then refluxed for several hours until a test sample shows no more dyestuff free of chromium. After adding sodium chloride the chromium-containing dyestuff can be well filtered.

The conversion into a chromium complex compound can also be carried out in a shorter time; this is done in the following way:

200 grams of a basic chromium sulfate solution corresponding to 76 grams of Cr$_2$O$_3$ are mixed with 5 litres of water and, after adding 276 grams of salicylic acid, heated to the boil. The mixture is rendered weakly alkaline by slowly adding a 30 percent caustic soda solution and the clear solution is filled up to 7 litres. 47 grams of the disazo dyestuff prepared according to Example 1 are dissolved in 1 litre of hot water with addition of caustic soda solution to which 500 cc. of the above-described chrome-salicylic acid solution are added. The mixture is then refluxed at the boil until the original dyestuff can no longer be detected. The chromium-containing dyestuff thus obtained is separated at neutral reaction by adding sodium chloride and dried. After grinding the dyestuff is obtained as a black powder. Animal fibres and also polyamide fibres can be dyed therewith from an acid to neutral bath in black-brown shades showing good fastness to wet processing and to light.

Example 3

17.3 grams of 1-aminobenzene-2-sulfonic acid are diazotized and coupled with 15.1 grams of 2-acetylamino-1-hydroxybenzene to the monoazo dyestuff according to Example 1. The dyestuff is separated by adding sodium chloride, filtered and saponified with dilute hydrochloric acid at 80° C. After cooling the hydroxyaminomonoazo dyestuff is isolated and dissolved in water with addition of caustic soda solution. 7 grams of sodium nitrite are added to the solution which is then dropped into diluted hydrochloric acid at 5–10° C. with stirring. Finally the diazotization mixture is stirred for a further half hour and then added to an alkaline (caustic soda) solution of 14.4 grams of 2-hydroxynaphthalene. After adding sodium chloride the disazo dyestuff obtained is filtered off; it corresponds in the free state to the formula:

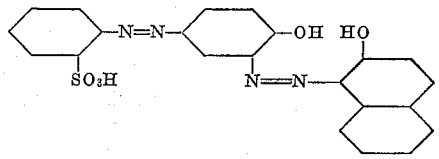

It dyes wool red shades. By converting the dyestuff on the fibre into the chromium complex compound, a black-brown shade is obtained which is fast to wet processing and to light. By treating the dyestuff in substance with chromium yielding agents according to Example 2 after drying a black powder is obtained which dyes wool or polyamide fibres black-brown shades of good fastness properties.

If instead of 1-aminobenzene-2-sulfonic acid the corresponding diazo components containing in 4-position a $CH_3$- or Cl-substituent are used, dyestuffs of similar fastness properties and shades are obtained which are, however, better suited for the monochrome method than the unsubstituted ones.

Example 4

The diazo compound of 22.3 grams of 1-aminonaphthalene-4-sulfonic acid prepared in the usual manner is added to a solution of 15.1 grams of 2-acetylamino-1-hydroxybenzene, 10 cc. of a 30 percent caustic soda solution, 25 grams of sodium carbonate and 100 cc. of water. After stirring half an hour the solution is heated to 90° C. and 1/10 of its volume of a 30 percent caustic soda solution is added thereto. The temperature is maintained for one hour at 90–100° C.; the solution is then rendered weakly acid, and the precipitation of the aminohydroxymonoazo dyestuff is completed with sodium chloride. The dyestuff is filtered off at 70° C., dissolved in water with adding caustic soda solution and quickly poured into diluted hydrochloric acid at 0–5° C. with stirring. While this temperature is maintained a solution of sodium nitrite is slowly added until the detection of nitrous acid remains positive. The diazotization mixture is added to a sodium hydroxide alkaline solution of 14.4 grams of 2-hydroxynaphthalene. After stirring several hours the dyestuff is filtered off without further adding sodium chloride and then washed with a 5 percent sodium chloride solution. The dyestuff thus obtained corresponds in the free state to the formula:

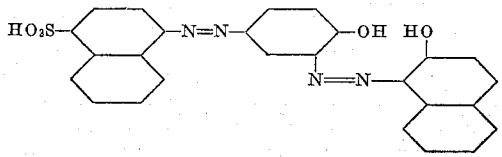

and yields on animal fibres and polyamide fibres red shades which, when treated with chromium yielding agents, change to black-brown shades of good fastness properties.

52 grams of the dyestuff described in this example are dissolved in 800 cc. of hot water with 10 cc. of caustic soda solution. 450 cc. of the chrome-salicylic acid solution prepared according to Example 2 are added thereto. The mixture is heated with stirring until the original dyestuff can no longer be detected. Now sodium chloride is added. It is only after further heating that the chromium-containing dyestuff separates in a form which can be well filtered. It is filtered off and dried. The chromium-containing dyestuff is obtained as a black powder and dyes animal fibres and polyamide fibres from an acid or neutral bath in black-brown shades showing good fastness to wet processing and to light.

When using in this example instead of 2-hydroxynaphthalene 17.7 grams of acetoacetanilide or 21.5 grams of 1-(3'-nitrophenyl)-3-methyl-5-pyrazolone, disazo dyestuffs are obtained which, when converted into their chromium complex compounds either on the fibre or in substance, dye animal fibres and polyamide fibres strong reddish brown shades which show good fastness to wet processing and to light.

When replacing in this example the 2-hydroxynaphthalene by 1-acetylamino-7-hydroxynaphthalene, the chromium complex compound prepared on the fibres or in substance yields on animal fibres and polyamide fibres an olive-green which shows good fastness to wet processing and to light.

If at first diazo component 1-aminonaphthalene-5-sulfonic acid is employed in the above described combinations instead of 1-aminonaphthalene-4-sulfonic acid, dyestuffs of similar properties are obtained.

Example 5

22.3 grams of 1-aminonaphthalene-4-sulfonic acid are diazotized in the usual manner and added to a solution of 16.5 grams of 2-acetylamino-4-methyl-1-hydroxybenzene, 10 cc. of a 30 percent caustic soda solution and 25 grams of sodium carbonate in 150 cc. of water. The monoazo dyestuff obtained is separated by adding sodium chloride, filtered off, dissolved in 80 cc. of hot 5 percent caustic soda solution and heated for one hour to 90° C. Then the solution is rendered weakly acid and the precipitation is completed by adding sodium chloride. The aminohydroxymonoazo dyestuff thus obtained is dissolved in water with adding caustic soda solution; thereafter 7 grams of sodium nitrite are added and the mixture is dropped into diluted hydrochloric acid. After the diazotization is finished the mixture is added to a solution of 14.4 grams of 2-hydroxynaphthalene, 15 cc. of caustic soda solution and 25 grams of sodium carbonate in 150 cc. of water. After stirring for 4 hours the disazo dyestuff thus formed is filtered off without previously adding sodium chloride and dried. It corresponds in the free state to the formula:

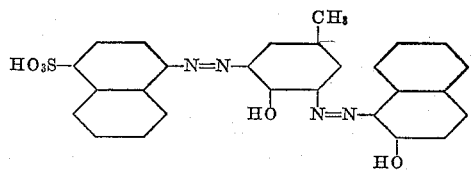

and dyes animal fibres and polyamide fibres red shades. By an after-treatment with chromium yielding agents in the usual manner and also by the monochrome method, bluish grey dyeings are obtained which show good fastness to wet processing and to light.

53.2 grams of the disazo dyestuff described in this example are dissolved in water with adding caustic soda solution and 700 cc. of the chrome-salicylic acid solution mentioned in Example 2 are added. After heating for several hours the original dyestuff can no longer be detected. The chromium-containing dyestuff is separated from the solution by adding sodium chloride and filtered. It dyes animal fibres and polyamide fibres from an acid or neutral bath grey shades which show good fastness to wet processing and to light.

*Example 6*

17.3 grams of 1-aminobenzene-4-sulfonic acid and 15.1 grams of 2-acetylamino-1-hydroxybenzene are coupled to the monoazo dyestuff according to Example 1, saponified and further diazotized. The diazotization mixture obtained is added to a solution prepared from 21.7 grams of carbomethoxy-1-amino-7-hydroxynaphthalene, 70 cc. of pyridine, 150 cc. of water, 9 cc. of a 30 percent caustic soda solution and 30 grams of sodium carbonate. After stirring for 5 minutes further 20 cc. of caustic soda solution are added. The dyestuff separates soon and is isolated. It corresponds in the free state to the formula:

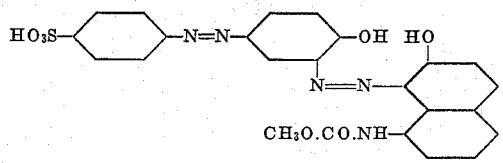

After drying it represents a dark powder which dyes wool from an acid bath red shades; by an after-treatment with chromium yielding agents the shade changes to olive. The dyeing shows good fastness to wet processing and to light.

The dyestuff can be converted into its chromium complex compound according to the process of Example 5. After drying it represents a brown-black powder which dyes wool from a weakly acid bath olive shades of good fastness properties.

I claim:
1. A chromium complex of a disazo dyestuff of the formula:

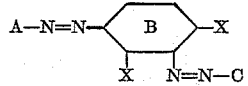

wherein A—N=N— stands for the radical of a diazo component containing a sulfonic acid group selected from the group consisting of the benzene and naphthalene series, C stands for a coupling component selected from the group consisting of 2-hydroxynaphthalenes, 1-aryl-5-pyrazolones and acetoacetarylamides free from sulfonic and carboxylic acid groups, one of the radicals X attached to benzene nuculus B represents a hydroxy group and the other hydrogen.

2. A chromium complex of a disazo dyestuff of the formula:

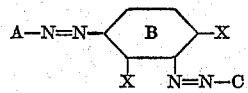

wherein A—N=N— stands for the radical of a diazo component containing a sulfonic acid group selected from the group consisting of the benzene and naphthalene series, C stands for a 2-hydroxynaphthalene free from sulfonic and carboxylic acid groups, one of the radicals X attached to the benzene nuculus B represents a hydroxy group and the other hydrogen.

3. A chromium complex of a disazo dyestuff of the formula:

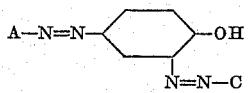

wherein A—N=N— stands for the radical of a diazo component containing a sulfonic acid group selected from the group consisting of the benzene and naphthalene series, C stands for a 2-hydroxynaphthalene free from sulfonic and carboxylic acid groups.

4. A chromium complex of a disazo dyestuff of the formula:

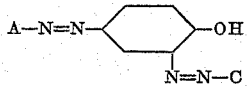

wherein A—N=N— stands for the radical of a diazo component of the naphthalene series containing a sulfonic acid group, C stands for a 2-hydroxynaphthalene free from sulfonic and carboxylic acid groups.

5. A chromium complex of a disazo dyestuff of the formula:

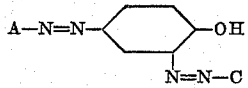

wherein A—N=N— stands for the radical of a diazo component of the benzene series containing a sulfonic acid group, C stands for a 2-hydroxynaphthalene free from sulfonic and carboxylic acid groups.

6. A chromium complex of a disazo dyestuff of the formula:

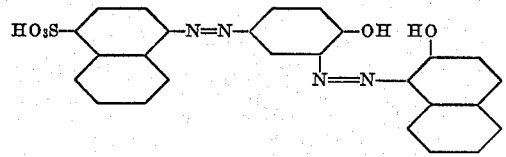

7. A chromium complex of a disazo dyestuff of the formula:

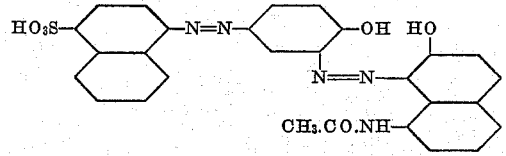

8. A chromium complex of a disazo dyestuff of the formula:

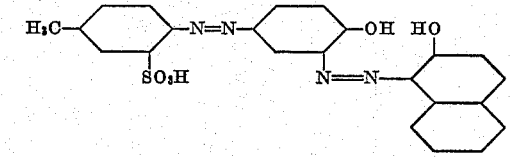

References Cited in the file of this patent
UNITED STATES PATENTS

| | | |
|---|---|---|
| 512,116 | Kirchhoff | Jan. 2, 1894 |
| 2,153,531 | Lange | Apr. 4, 1939 |
| 2,735,844 | Neier et al. | Feb. 21, 1956 |
| 2,779,758 | Neier et al. | Jan. 29, 1957 |